(12) United States Patent
Hurault et al.

(10) Patent No.: US 12,297,800 B2
(45) Date of Patent: May 13, 2025

(54) WIND TURBINE ROTOR BLADE WITH FRAMED ACCESS WINDOW

(71) Applicant: BLADE DYNAMICS LIMITED, Eastleigh (GB)

(72) Inventors: Jeremy Hurault, Eastleigh (GB); Harry Fish, Eastleigh (GB)

(73) Assignee: BLADE DYNAMICS LIMITED, Eastleigh (GB)

( * ) Notice: Subject to any disclaimer, the term of this patent is extended or adjusted under 35 U.S.C. 154(b) by 11 days.

(21) Appl. No.: 17/799,358

(22) PCT Filed: Feb. 12, 2021

(86) PCT No.: PCT/EP2021/053453
§ 371 (c)(1),
(2) Date: Aug. 12, 2022

(87) PCT Pub. No.: WO2021/160801
PCT Pub. Date: Aug. 19, 2021

(65) Prior Publication Data
US 2023/0106374 A1    Apr. 6, 2023

(30) Foreign Application Priority Data
Feb. 14, 2020 (GB) ...................... 2002062

(51) Int. Cl.
*F03D 1/06* (2006.01)
(52) U.S. Cl.
CPC .... *F03D 1/0675* (2013.01); *F05B 2240/3062* (2020.08); *F05B 2260/96* (2013.01)

(58) Field of Classification Search
CPC ............ F03D 1/0675; F05B 2240/3062; F05B 2260/96; Y02E 10/72; Y02P 70/50
See application file for complete search history.

(56) References Cited

U.S. PATENT DOCUMENTS

| 2,156,110 A | * | 4/1939 | Brukner | ................ B64C 1/1446 |
| | | | | 114/174 |
| 4,391,065 A | * | 7/1983 | Rice | .......................... E05F 7/04 |
| | | | | 49/398 |
| 4,556,591 A | * | 12/1985 | Bannink, Jr. | ........... B29C 66/61 |
| | | | | 403/267 |
| 5,088,665 A | * | 2/1992 | Vijgen | .................. F03D 1/0675 |
| | | | | 244/215 |
| 5,765,312 A | * | 6/1998 | Szyjkowski | .......... E04F 19/083 |
| | | | | 49/463 |

(Continued)

FOREIGN PATENT DOCUMENTS

| EP | 2243955 A2 | 10/2010 |
| EP | 2816225 A1 | 12/2014 |

(Continued)

*Primary Examiner* — David E Sosnowski
*Assistant Examiner* — Wayne A Lambert
(74) *Attorney, Agent, or Firm* — Nath, Goldberg & Meyer; Jerald L. Meyer; Tanya E. Harkins (57) ABSTRACT

The present invention relates to a wind turbine blade (10) with an access window (94) extending through a shell body of the blade. A frame (96), which defines an opening (97), is arranged on top of the outer surface of the blade such that the opening of the frame (96) is aligned with the access window. A cover member (92) covers the opening (97) of the frame and releasably closes the access window.

15 Claims, 6 Drawing Sheets

(56) References Cited

U.S. PATENT DOCUMENTS

| | | | | |
|---|---|---|---|---|
| 6,848,226 | B1* | 2/2005 | Boyd | E04F 19/08 |
| | | | | 52/220.8 |
| 7,334,989 | B2* | 2/2008 | Arelt | F03D 1/0675 |
| | | | | 416/229 R |
| 8,177,169 | B2* | 5/2012 | Lobo Barros | B64C 7/00 |
| | | | | 244/131 |
| 8,240,993 | B2* | 8/2012 | Bhaisora | F03D 1/0633 |
| | | | | 416/91 |
| 9,297,357 | B2* | 3/2016 | Busbey | F03D 1/065 |
| 9,334,660 | B2* | 5/2016 | Nelson | E06B 5/01 |
| 9,506,452 | B2* | 11/2016 | Bakhuis | F03D 13/10 |
| 9,957,063 | B2* | 5/2018 | Kawashima | B64D 45/02 |
| 2008/0118365 | A1* | 5/2008 | Bendel | F03D 1/0658 |
| | | | | 416/244 R |
| 2008/0240925 | A1* | 10/2008 | Kita | F03D 80/30 |
| | | | | 416/230 |
| 2011/0142667 | A1* | 6/2011 | Miebach | F03D 13/10 |
| | | | | 416/223 R |
| 2014/0301855 | A1* | 10/2014 | Busbey | F03D 13/10 |
| | | | | 416/223 R |
| 2014/0361547 | A1* | 12/2014 | Alti Barbon | F03D 9/25 |
| | | | | 290/55 |
| 2015/0167473 | A1 | 6/2015 | Olson | |
| 2019/0032632 | A1* | 1/2019 | Danielsen | F03D 80/50 |
| 2019/0277248 | A1 | 9/2019 | Herrig et al. | |

FOREIGN PATENT DOCUMENTS

| | | | | |
|---|---|---|---|---|
| WO | WO-2010046288 | A2* | 4/2010 | F03D 1/001 |
| WO | WO-2011067323 | A2* | 6/2011 | F03D 1/0675 |
| WO | WO-2012167891 | A1* | 12/2012 | F03D 1/0675 |
| WO | 2017071717 | A1 | 5/2017 | |

* cited by examiner

WIND TURBINE ROTOR BLADE WITH FRAMED ACCESS WINDOW

This is a National Phase Application filed under 35 U.S.C. 371 as a national stage of PCT/EP2021/053453, filed Feb. 12, 2021, an application claiming the benefit of Great Britain Application No. 2002062.4, filed Feb. 14, 2020, the content of each of which is hereby incorporated by reference in its entirety.

FIELD OF THE INVENTION

The present invention relates to wind turbine blade with an access window extending through its shell body for accessing an interior space of the blade. In addition, the present invention relates to methods of manufacturing said blade.

BACKGROUND OF THE INVENTION

Wind power is one of the fastest-growing renewable energy technologies and provides a clean and environmentally friendly source of energy. Typically, wind turbines comprise a tower, generator, gearbox, nacelle, and one or more rotor blades. The kinetic energy of wind is captured using known airfoil principles. Modern wind turbines may have rotor blades that exceed 90 meters in length.

Wind turbine blades are usually manufactured by forming a shell body from two shell parts or shell halves comprising layers of woven fabric or fibre and resin. Spar caps or main laminates are placed or integrated in the shell halves and may be combined with shear webs or spar beams to form structural support members. Spar caps or main laminates may be joined to, or integrated within, the inside of the suction and pressure halves of the shell.

As the size of wind turbines increases, the manufacturing and transporting of wind turbine blades becomes more challenging and costly. As a solution to this problem wind turbine blades can be provided in two or more segments. This can result in an easier manufacturing process and may reduce the cost of transportation and erection of wind turbines. The respective blade segments may be transported to the erection site individually, where they can be assembled to form the wind turbine blade.

However, several challenges are associated with such segmented design. These often relate to the manufacturing and joining of the shell segments including load bearing structures such as spar beams, shear webs or other internal components. Due to the fact that internal parts of a wind turbine blade may have to be connected or disconnected as part of such processes, a suitable access solution needs to be provided to access internal blade parts from the outside of the blade.

WO 2011/067323 A2 discloses a sectional blade for a wind turbine, the blade comprising a first and a second blade section extending in opposite directions from a blade joint and being structurally connected by a spar bridge. A receiving section holds the spar bridge via a bearing member, which comprises two bearing halves. The bearing halves are assembled by bolts and connected to a spar section. The bolts may be tightened through openings in the blade shells, which may be filled afterwards to provide a smooth outer surface of the blade.

WO 2012/167891 A1 relates to a rotor blade of a wind turbine having an accessible cavity, wherein the rotor blade shell has a closable opening with a hatch closing flush with the outer layer of the rotor blade shell. The opening is designed for rescuing maintenance workers in the event of an accident or emergency. The hatch is permanently attached to the shell with a hinge for opening the hatch with an inwardly or outwardly directed pivot movement.

US 2015/0167473 A1 discloses a method for modifying a rotor blade for a wind turbine, the method comprising removing a cutout section from a shell of the rotor blade, wherein removing the cutout section provides an access window to an interior support section of the rotor blade and sealing the cutout section back to the shell to close the access window. The method comprises connecting a support lip to at least a portion of a perimeter of the access window for supporting the cutout section when it is sealed back to the shell. The support lip is connected to the interior surface of the shell and is made of additional resin-infused fiber material bonded to the shell.

Some existing access solutions include a number of additional manufacturing steps when moulding the shell body of the blade, in particular solutions in which the access opening and its closing device are designed such that the closing device is flush with the surrounding outer surface of the blade shell body. This will often require additional manufacturing steps such as the moulding of recessed blade areas, adding to the complexity and cost of such processes. In addition, some of the above-mentioned known solutions require the provision of additional materials that have to be bonded to parts of the shell, why may be costly and which may pose additional challenges in providing a secure bonding between the surfaces involved. There is consequently a need in the art for providing an improved and/or simplified access solution for wind turbine blades.

It is therefore an object of the present invention to provide a wind turbine blade with an improved access opening arrangement.

Particularly, it is an object of the present invention to provide an access opening arrangement for a wind turbine blade or related structures that is easy to manufacture and to assemble.

It is another object of the present invention to provide an access opening arrangement for a wind turbine blade or related structures that has minimal impact on blade performance, such as aerodynamic properties

SUMMARY OF THE INVENTION

It has been found that one or more of the aforementioned objects can be obtained by a wind turbine blade having a profiled contour including a pressure side and a suction side, and a leading edge and a trailing edge with a chord having a chord length extending therebetween, the wind turbine blade extending in a spanwise direction between a root end and a tip end, wherein the blade comprises
 an outer surface,
 an access window extending through a shell body of the blade,
 a frame defining an opening, wherein the frame is arranged on top of the outer surface of the blade such that the opening of the frame is aligned with the access window,
 a cover member dimensioned for receipt within the frame for covering the opening of the frame and for releasably closing the access window.

Such rotor blades can be manufactured with significantly reduced complexity required in the tooling of the blade. By placing the frame on top of the outer surface, the number and complexity of post moulding operations is greatly reduced. Advantageously, a separately manufactured frame can be used, at a reduced cost, for example using an injection moulded component. The shape of the frame can also be designed with various aerodynamic optimisations that will reduce drag and the risk of operational noise creation.

In addition, the use of a dedicated frame which can be adhered to the outer surface of the blade to receive the cover member provides a safer and more stable configuration as compared to some of the known access arrangements, thus preventing undesired separation of the cover member from the blade.

The blade will typically comprise two shell halves, a pressure side shell half and a suction side shell half. The shell halves, optionally including one or more types of coating, usually form a continuous outer surface of the blade. Preferably, the outer surface of the blade serves as an aerodynamic surface when the blade is subjected to an air stream.

The access window may advantageously be configured to provide access to the interior of at least a portion of the rotor blade. The access window may be cut out or drilled through the shell body using a drill jig. It is preferred that the access window is formed in the suction side shell half of the blade. Preferably, the access window is configured to allow access to an internal spar element or shear web of the blade. Preferably, the access window is disposed between a spar element, such as a box spar, and the trailing edge of the blade. The access window may be provided by cutting the shell to form a cut-out section into and through the shell body and removing the cut-out section to provide the access window. To this end, a template or jig of the cut-out section can be placed on the outer surface of the shell body.

In a preferred embodiment, the access window is substantially rectangular, such as a rectangular shape with rounded corners. Thus, the access window may be formed by cutting a substantially rectangular opening into the shell, preferably into the suction side shell half of the blade, such that the shell is penetrated to allow access to an interior part of the blade.

In a preferred embodiment, the frame is arranged on top of the outer surface of the blade along the edges of the access window such that the frame covers each edge of the access window. Typically, the frame is fixed on the outer surface of the blade, for example, by adhesive bonding. The frame will usually comprise four sides or frame members surrounding the opening defined by the frame. In an advantageous embodiment, the frame has a substantially rectangular shape, such as a rectangular shape with rounded corners, wherein the opening defined by the frame is preferably also substantially rectangular, such as a rectangular shape with rounded corners. The opening defined by the frame will usually have smaller dimensions, such as a smaller area, than the dimensions or area of the access window.

The thickness of the frame may taper towards the outer circumference of the frame. This ensures a smooth transition between the outer blade surface and the frame. Thus, an outer edge of the frame may have a lower thickness than an inner edge of the frame. Preferably, the thickness of the frame tapers in a continuous fashion from the inner edge, adjacent to the opening defined by the frame, to the outer edge of the frame.

The opening defined by the frame is aligned with the access window. Thus, interior parts of the blade may be accessed through the aligned opening and access window. Preferably, the area of the opening of the frame corresponds to at least 50%, such as at least 75%, or at least 90% of the area of the access window. Preferably, the opening defined by the frame is aligned such with the access window that the opening is arranged at the centre of the access window.

The cover member is dimensioned for receipt within the frame for covering the opening of the frame and for releasably closing the access window. Thus, the cover member has at least the same extent or surface area than the extent or surface area of the opening defined by the frame.

The cover member will usually comprise an outer surface and an opposing inner surface, wherein the inner surfaces faces towards the interior of the wind turbine blade when the cover member is arranged within and fixed to the frame. The outer surface of the cover member can be a curved or profiled surface, which preferably has the same curvature or profile as the outer surface of the shell member at that location of the blade. In some embodiments, the cover member comprises a thermoplastic material, such as a thermoplastic polyurethane.

According to one embodiment, the access opening allows for inserting and/or withdrawing a chordwise locking pin into an internal blade element, such as a spar structure, preferably a spar beam or box spar.

Preferably, the wind turbine blade of the present invention may comprise at least one locking pin for releasably locking two or more spar elements to each other. The wind turbine blade of the present invention preferably comprises two or more segments, such as a tip end segment and a root end segment, each segment comprising a pressure side shell member and a suction side shell member. Typically, the wind turbine blade comprises one or more shear webs or spar beams. In some embodiments, a first spar structure is arranged in a first blade segment and a second spar structure is arranged in a second blade segment.

In a preferred embodiment, at least part of the frame protrudes above the outer surface of the blade. Thus, the frame preferably extends beyond the outer blade surface in a flapwise direction. It was found that this configuration allows for a considerably easier manufacturing process as compared to known access solutions for wind turbine blades. Thus, the frame can be easily fixed on the outer blade surface without having to provide for flush surfaces or having to account for manufacturing tolerances in this regard. The dimensioning and fitting of the cover member within the frame can be done independently from the blade shell manufacturing process. In some embodiments, the frame protrudes above the outer surface of the blade by at least 5 mm, such as at least 10 mm.

In a preferred embodiment, the frame comprises one or more aerodynamic surface features, such as one or more vortex generators. These may be advantageously included to improve the aerodynamic properties of the blade.

In a preferred embodiment, the frame further comprises one or more noise-reducing features, such as one or serrations. These may be advantageously included to reduce operational noise of blade, including any noise created by including the framed access window of the present invention. In a preferred embodiment, one or more serrations, such as at least two, or preferably at least three serrations, are integrally formed as part of the frame.

In another embodiment, the cover member further comprises one or more noise-reducing features, such as one or serrations. These may be advantageously included to reduce operational noise of blade, including any noise created by including the framed access window of the present invention. In a preferred embodiment, one or more serrations, such as at least two, or preferably at least three serrations, are integrally formed as part of the cover member. In some embodiments, the cover member comprises one or more noise reduction devices such as serrations, ridges, and/or finlets. Thus, the cover member may advantageously comprise a plurality of serrations, such as at least 5 serrations.

In a preferred embodiment, the cover member comprises one or more aerodynamic surface features, such as one or more vortex generators. These may be advantageously included to improve the aerodynamic properties of the blade.

In a preferred embodiment, at least part of the frame extends beyond the trailing edge of the blade as seen in a chord-wise direction. In some embodiments, the frame extends beyond the trailing edge of the blade by at least 10 mm, such as at least 50 mm as seen in a chord-wise direction.

In a preferred embodiment, the cover member is releasably fastened to the frame. According to one embodiment, one or more fasteners are used in this regard. In a preferred embodiment, the fasteners are single-sided fasteners, preferably rivets. This results in an easy and efficient fastening method, which is safe and cost-effective. In a preferred embodiment, the one or more fasteners are screw rivets. Screw rivets may be made of a polymer material such as nylon, and may comprise two separate parts which can be assembled. In other embodiments, the one or more fasteners comprise rivet screws, such as rivet screws which can be screwed into the threaded sleeve of a rivet tool, wherein the rivet sleeve can be inserted into a hole. Rivet screws may be used in combination with one or more additional screwed components for releasably fastening the cover member to the blade shell member.

In a preferred embodiment, the cover member is releasably fastened to the frame by one or more fasteners made of one or more dielectric materials. In a preferred embodiment, the one or more fasteners comprise a dielectric material. Preferably the one or more fasteners consist of one or more dielectric material. This is particularly advantageous when the framed access window is part of a lightning protection system of a wind turbine blade. In some embodiments, the dielectric material is a polymer, preferably a polyamide, preferably nylon, most preferred Nylon 6. It is thus preferred that the one or more fasteners are non-metallic fasteners.

In a preferred embodiment, each fastener is releasably inserted in aligned respective holes provided in the cover member and in the frame. In some embodiments, each of the cover member and the frame comprises at least four holes for receiving fasteners therein. In another embodiment, the holes provided in the cover member are arranged annularly along an outer circumference of the cover member. Thus, each hole may be located not further than 50 mm, such as not further than 30 mm, from an outer edge of the cover member.

In a preferred embodiment, the aligned respective holes provided in the cover member and the frame are arranged such that the cover member can be releasably fastened to the frame in a single spatial orientation only. Thus, it can be prevented that the cover member is attached to the frame in an incorrect orientation.

In another embodiment, the cover member is releasably fastened to the frame by using a pre-moulded interlocking clip arrangement between the two parts. This may also include a sealing member arranged between the cover member and the frame. The interlocking clip arrangement may be provided in the form of a self-sprung interlocking structure. Such fastening solution may advantageously increase the aerodynamic smoothness in the area of the framed access window.

In a preferred embodiment, the frame comprises a front member, a rear member and two lateral members wherein the opening defined by the frame is substantially rectangular. Thus, the front member, the rear member and the two lateral members preferably together surround and define the opening of the frame. The thickness of each of the front member, rear member or lateral members may taper towards the outer circumference of the frame. This ensures a smooth transition between the outer blade surface and the frame.

In a preferred embodiment, the front member is arranged substantially parallel to the leading edge of the blade, wherein the rear member is arranged substantially parallel to the trailing edge of the blade. Thus, preferably the lateral members are arranged substantially in a chordwise direction.

In a preferred embodiment, the front member is arranged closer to the leading edge of the blade than the rear member.

In a preferred embodiment, the rear member comprises one or more noise reduction devices such as serrations, ridges, and/or finlets. Thus, the rear member of the frame may advantageously comprise a plurality of serrations, such as at least 5 serrations.

In a preferred embodiment, the front member is shaped in waveform or as a plurality of serrations. In a preferred embodiment, the serrations are formed as an integral part of the front member.

In a preferred embodiment, the front member comprises one or more vortex generators. The vortex generators may be formed integrally with the front member of the frame.

Typically, the shell body comprises a pressure side shell member and at least one suction side shell member.

In a preferred embodiment, at least one sealing member is arranged between the cover member and the frame. This advantageously leads to a tight fit and to an efficient barrier to moisture and/or debris through the closed access window. The sealing member arranged between the cover member and the frame will preferably be a gasket, preferably an annular gasket which usually has substantially the same shape as the outer circumference of the cover member. The sealing member may be adhesively fastened or bonded to the frame. Preferably, a plurality of fasteners is used for releasably fastening the cover member to the frame, such as two or more, five or more, most preferably ten or more fasteners.

In a preferred embodiment, the framed access window comprises a retaining member connecting the cover member and the blade independently of the one or more fasteners. The retaining member preferably comprises a pad eye, such as a soft pad eye, attached to the cover member, preferably an inner surface thereof. The retaining member may further comprise a chord or strap attached to the pad eye at one end and attached to the frame or to the inside of the wind turbine blade at another end. The retaining member helps to secure the cover member to the blade when the cover member is opened at height, for example during maintenance or other operations in which access to the inside of the blade is necessary.

In a preferred embodiment, the sealing member is an annular gasket, preferably comprising an ethylene propylene diene monomer (EPDM) material, such as a EPDM sponge rubber or EPDM foam. In some embodiments, the frame opening has a height of 450-650 mm, such as 500-600 mm, and a width of 350-550 mm, such as 400-500 mm. In a preferred embodiment, the frame opening covers an area of not more than 0.25 m2, such as not more than 0.2 m2. It was found that such comparatively small openings lead to minimal aerodynamic disturbance yet allowing the servicing of internal parts such as locking pin arrangements and connections of a lightning protection system.

In another embodiment, the access opening arrangement further comprises a self-adhesive layer provided between the cover member and the frame. According to one embodiment, the cover member is substantially made of the same material as the blade shell body.

In a preferred embodiment, the frame is adhesively bonded to the shell member. In some embodiments, double-sided tape, glue, resin or a similar adhesive material is used in this regard.

In a preferred embodiment, the frame is manufactured in an injection moulding process. This allows for a particularly cost-efficient and simple manufacturing process of the blade of the present invention.

In a preferred embodiment, the opening extends over an area of not more than 0.25 m².

In another aspect, the present invention relates to a method of manufacturing a wind turbine blade having a profiled contour including a pressure side and a suction side, and a leading edge and a trailing edge with a chord having a chord length extending therebetween, the wind turbine blade extending in a spanwise direction between a root end and a tip end, wherein the blade comprises
an outer surface, the method comprising the steps of
cutting an access window through a shell body of the blade,
arranging a frame defining an opening on top of the outer surface of the blade such that the opening of the frame is aligned with the access window, and
arranging a cover member within the frame to cover the opening of the frame and to close the access window.

Typically, the outer surface is a profiled surface, wherein preferably the access window is provided at a location of said profiled surface.

In another aspect, the present invention relates to a method of manufacturing a wind turbine blade according to the present invention, the method comprising the steps of:
manufacturing a pressure side shell half and a suction side shell half,
arranging a spar structure within the pressure side shell half or within the suction side shell half, the spar structure comprising a first part and a second part, the first and second part being releasably coupled to each other,
cutting an access window through the suction side shell half or the pressure side shell half, preferably the suction side shell half,
arranging a frame defining an opening on top of the outer surface of the blade such that the opening of the frame is aligned with the access window extending through the shell half,
bonding the frame to the shell half, and
arranging the cover member within the frame for covering the opening of the frame and for closing the access window.
joining the pressure side shell half and the suction side shell half for obtaining a closed shell body,
cutting the closed shell body along a cutting plane substantially normal to the spanwise direction of the closed shell body to obtain a first and a second blade segment, each blade segment comprising part of the pressure side shell half and part of the suction side shell half, wherein the spar structure extends across the cutting plane,
uncoupling the first and second part of the spar structure,
separating the first blade segment from the second blade segment,
joining and sealing the first blade segment to the second blade segment for obtaining the wind turbine blade,
wherein the spar structure comprises at least one locking pin for releasably coupling the first part to the second part of the spar structure through aligned respective locking apertures in each of the first and second part of the spar structure.

In a preferred embodiment, the step of uncoupling the first and second part of the spar structure comprises withdrawing the locking pin from the aligned respective apertures in each of the first and second part of the spar structure via the access window.

In a preferred embodiment, the method further comprises a step of re-inserting the locking pin into the aligned respective apertures in each of the first and second part of the spar structure via the access window, after joining and sealing the first blade segment to the second blade segment.

By manufacturing the wind turbine blade using a spar structure comprising a first part and a second part, releasably coupled to each other, an efficient and elegant method is provided for segmenting and re-assembling such wind turbine blade, including uncoupling and preferably re-coupling said parts.

Preferably, the pressure side shell half and the suction side shell half are manufactured over the entire length of the wind turbine blade, i.e. over their entire final length. The pressure side shell half and the suction side shell half will typically be adhered or bonded to each other near the leading edge and near the trailing edge. Each shell half may comprise longitudinally/spanwise extending load carrying structures, such as one or more main laminates or spar caps, preferably comprising reinforcement fibres such as glass fibres, carbon fibres, aramid fibres, metallic fibres, such as steel fibres, or plant fibres, or mixtures thereof. The shell halves will typically be produced by infusing a fibre lay-up of fibre material with a resin such as epoxy, polyester or vinyl ester.

Usually, the pressure side shell half and the suction side shell half are manufactured using mould structures. Each of the shell halves may comprise spar caps or main laminates provided along the respective pressure and suction side shell members. The spar caps or main laminates may be affixed to the inner faces of the shell halves. The spar structure is preferably a longitudinally extending load carrying structure, preferably comprising a beam or spar box for connecting and stabilizing the shell halves. The spar structure may be adapted to carry a substantial part of the load on the blade.

The spar structure preferably comprises a first part and a second part, the first and second part being releasably coupled to each other, such as releasably fixed or locked to each other. In some embodiments, the first and second part are releasably coupled to each other by one or more mechanical devices. In some embodiments, the first and second part are releasably coupled to each other by a mechanical locking mechanism. The second part of the spar structure may advantageously comprise a spar beam or a spar box. The first part of the spar structure may preferably comprise an arrangement for receiving the second part, such as a hollow member or a sheath.

The step of joining the pressure side shell half and the suction side shell half for obtaining a closed shell body may be carried out using any suitable joining mechanism or process, including adhesives, bonding material, mechanical fasteners, and any combination of the same. The closed shell is preferably a full-length preform of the final wind turbine blade obtainable by the method of the present invention.

In the step of cutting the closed shell body the closed shell is cut along a cutting plane substantially normal to the spanwise direction or longitudinal axis of the closed shell. In other words, the spanwise direction or longitudinal axis of the closed shell is substantially normal to said cutting plane. It is preferred that only the shell body is cut along the cutting plane. It is also preferred that the spar structure is not cut in this step.

In some embodiments, the first blade segment constitutes 30-80%, such as 40-70%, of the entire longitudinal extent of the blade. In some embodiments, the second blade segment constitutes 10-50%, such as 20-40%, of the entire longitudinal extent of the blade. Advantageously, the spar structure extends across the cutting plane, preferably without being cut. The first and second blade segments may include respective ends with complimentary joint sections that are joinable at a chord-wise joint.

The step of uncoupling the first and second part of the spar structure is preferably performed by unlocking a mechanical locking mechanism. After separating the first blade segment from the second blade segment, the individual blade segments may be individually transported, for example by respective trucks. The first blade segment and the second blade segment may be transported to an erection site for a wind turbine. The step of joining and sealing the first blade segment to the second blade segment for obtaining the wind turbine blade may advantageously be performed at the erection site of the wind turbine. This step may be carried out using any suitable joining and/or sealing mechanism or process, including adhesives, bonding material, mechanical fasteners, and any combination of the same.

In a preferred embodiment, the first part of the spar structure is fixed to the first blade segment. In some embodiments, the first part of the spar structure is glued or adhered to the first blade segment, preferably to both the partial suction side shell half and the partial pressure side shell half. In a preferred embodiment, the first part of the spar structure does not extend beyond the first blade segment.

According to some embodiments, the second part of the spar structure is fixed, such as glued or adhered, to the second blade segment, preferably to both partial shell halves. The second part of the spar structure preferably extends beyond the second blade segment into the first blade segment. Thus, the second part of the spar structure preferably protrudes from within the second part of the spar structure. In a preferred embodiment, the first blade segment comprises the root end of the blade. In another preferred embodiment, the second blade segment comprises the tip end of the blade. The blade may be also cut into more than two segments.

In some embodiments, the second part of the spar structure comprises a spar member, such as a spar beam or a spar box, the spar box preferably comprising at least one spar beam and at least one spar flange. In some embodiments, the first part of the spar structure comprises a receiving member, preferably a sheath member, for at least partly receiving or enclosing the second part of the spar structure. In some embodiments, the second part of the spar structure comprises a spar member, which is at least partly received or enclosed in a receiving structure. The receiving structure can be a jacket, for example a jacket comprising a mesh or net-like structure. In some embodiments, the jacket is made of the same material as the sheath member of the first part of the spar structure. It is preferred that the jacket is a conductive jacket.

According to some embodiments, the sheath member is substantially box-shaped. In other embodiments the sheath member is hollow. In other embodiments, the sheath member comprises a mesh or a net-structure. In a preferred embodiment, the sheath member is a conductive sheath member. In a preferred embodiment, the conductive sheath member is part of a lightning protection system of the wind turbine blade. In a preferred embodiment the conductive sheath member of the first part and the conductive jacket of the second part are both part of a lightning protections system of a wind turbine blade.

In a preferred embodiment, the spar structure comprises at least one locking pin for releasably coupling the first part to the second part of the spar structure through aligned respective locking apertures in each of the first and second part of the spar structure. In other embodiments, the spar structure comprises two or more, such as three or more, or four or more, locking pins and two or more, such as three or more, or four or more, respective locking apertures in each of the first and second part of the spar structure. Preferably, the locking apertures are respective through holes formed in the sheath member and the spar member, respectively.

In a preferred embodiment, the pressure side shell half and the suction side shell half are manufactured in respective mould halves, preferably by vacuum assisted resin transfer moulding. According to some embodiments, the pressure side shell half and the suction side shell half each have a longitudinal extent L of 50-90 m, preferably 60-80 m.

The framed access window of the present invention advantageously allows for installation of a chordwise locking pin for releasably coupling a first part to a second part of a spar structure. The framed access window may also be used to access internal parts within a wind turbine blade such as connections of a blade lightning protection system or for general maintenance operations. It was found that the framed access window of the present invention minimizes or completely avoids negative impacts on the aerodynamic performance and structural integrity of the wind turbine blade, while efficiently preventing influx and efflux of liquid or debris.

The present invention also relates to a wind turbine blade obtainable by the method of manufacturing a wind turbine blade as described above. The present wind turbine blade can be easily and efficiently assembled due to its spar structure and its coupling and de-coupling properties.

As used herein, the term "spanwise" is used to describe the orientation of a measurement or element along the blade from its root end to its tip end. In some embodiments, spanwise is the direction along the longitudinal axis and longitudinal extent of the wind turbine blade.

DESCRIPTION OF THE INVENTION

The invention is explained in detail below with reference to an embodiment shown in the drawings, in which.

DETAILED DESCRIPTION

Figure 1:
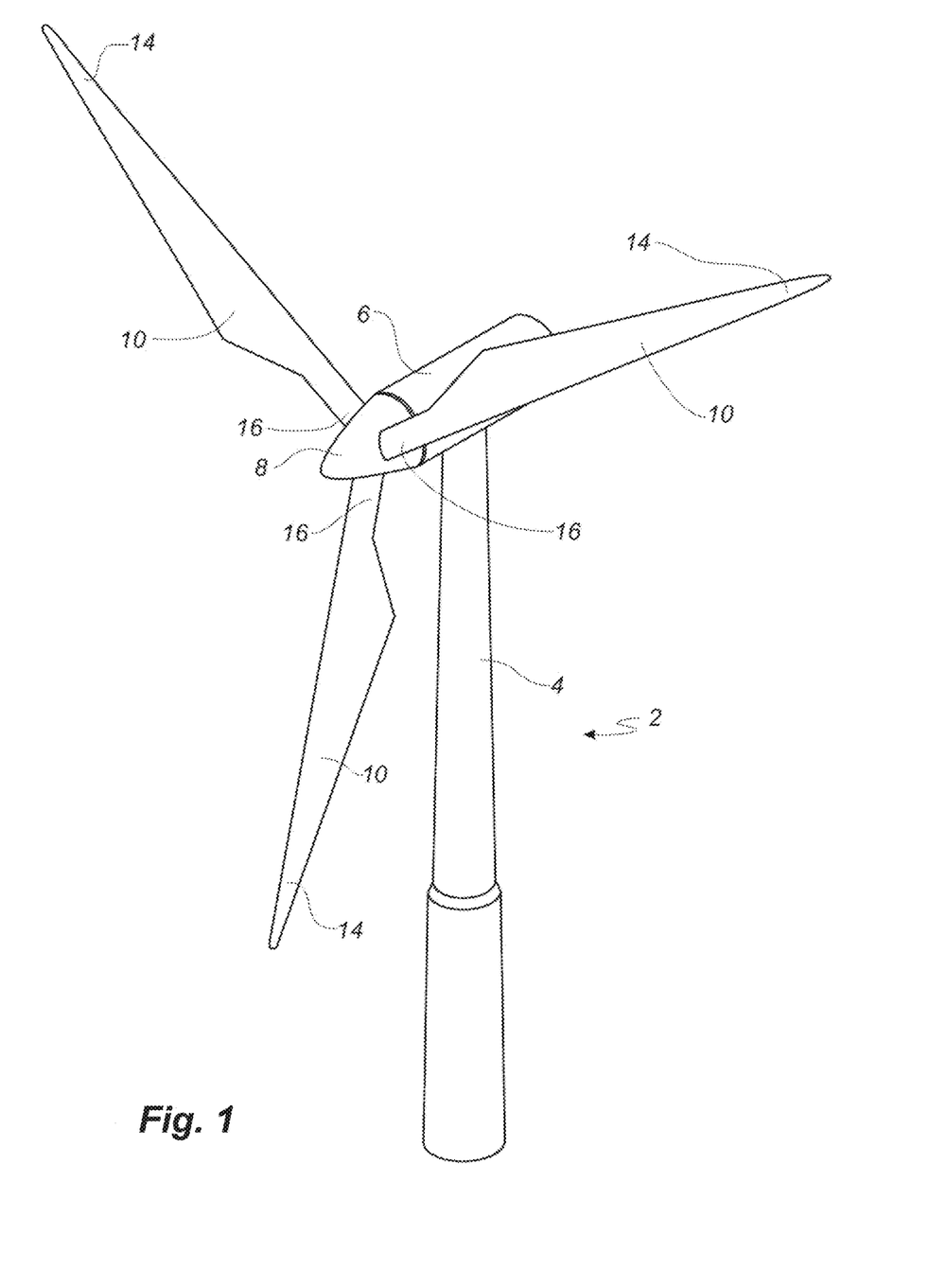
FIG. 1 shows a wind turbine.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 farthest from the hub 8. The rotor has a radius denoted R.

Figure 2:
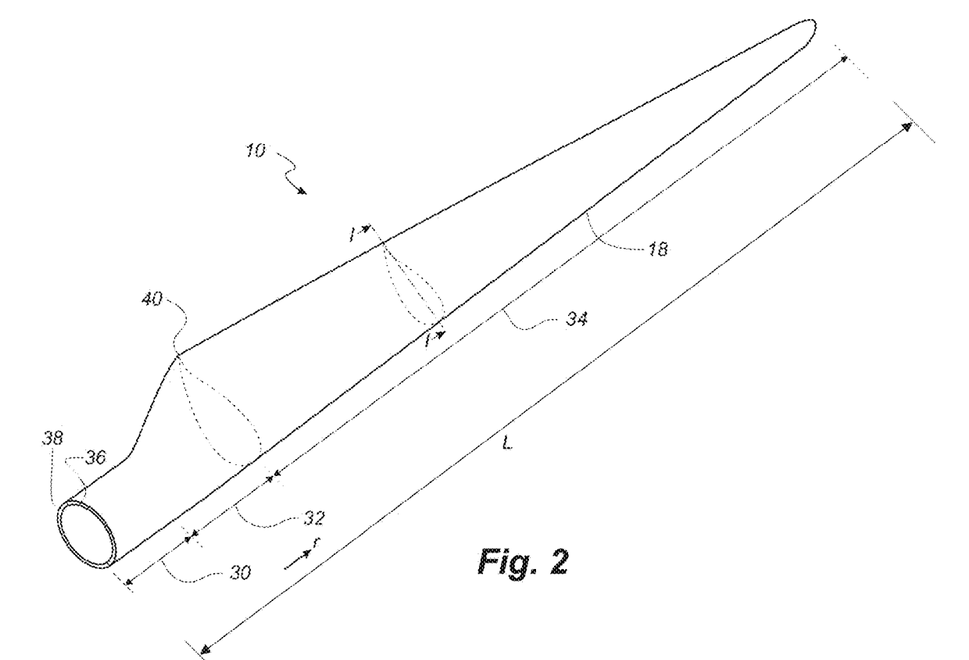
FIG. 2 shows a schematic view of a wind turbine blade.

FIG. 2 shows a schematic view of a wind turbine blade 10. The wind turbine blade 10 has the shape of a conventional wind turbine blade and comprises a root region 30 closest to the hub, a profiled or an airfoil region 34 farthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34. FIG. 2 also illustrates the longitudinal extent L, length or longitudinal axis of the blade.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The blade is typically made from a pressure side shell part 36 and a suction side shell part 38 that are glued to each other along bond lines at the leading edge 18 and the trailing edge of the blade 20.

Figure 3:
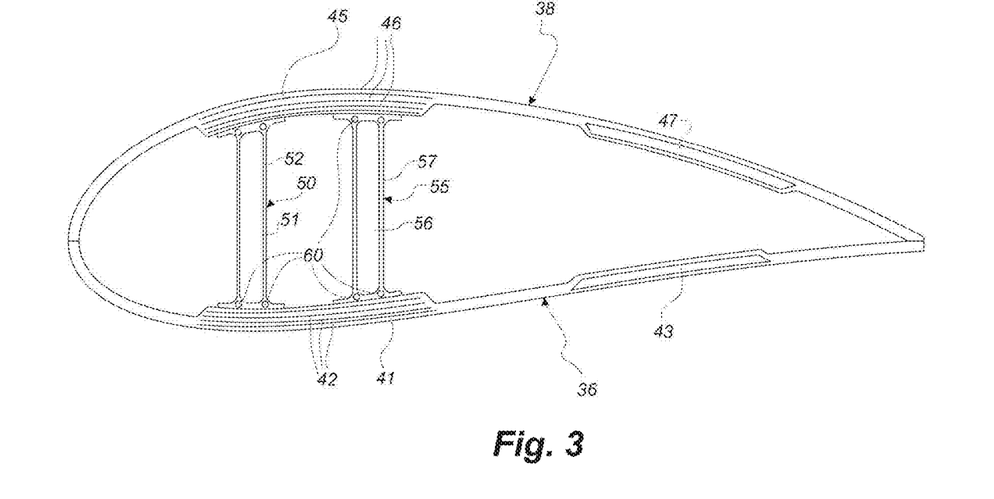
FIG. 3 shows a schematic view of a cross-section of a wind turbine blade.

FIG. 3 shows a schematic view of a cross section of the blade along the line I-I shown in FIG. 2. As previously mentioned, the blade 10 comprises a pressure side shell part 36 and a suction side shell part 38. The pressure side shell part 36 comprises a spar cap 41, also called a main laminate, which constitutes a load bearing part of the pressure side shell part 36. The spar cap 41 comprises a plurality of fibre layers 42 mainly comprising unidirectional fibres aligned along the longitudinal direction of the blade in order to provide stiffness to the blade. The suction side shell part 38 also comprises a spar cap 45 comprising a plurality of fibre layers 46. The pressure side shell part 38 may also comprise a sandwich core material 43 typically made of balsawood or foamed polymer and sandwiched between a number of fibre-reinforced skin layers. The sandwich core material 43 is used to provide stiffness to the shell in order to ensure that the shell substantially maintains its aerodynamic profile during rotation of the blade. Similarly, the suction side shell part 38 may also comprise a sandwich core material 47.

The spar cap 41 of the pressure side shell part 36 and the spar cap 45 of the suction side shell part 38 are connected via a first shear web 50 and a second shear web 55. The shear webs 50, 55 are in the shown embodiment shaped as substantially I-shaped webs. The first shear web 50 comprises a shear web body and two web foot flanges. The shear web body comprises a sandwich core material 51, such as balsawood or foamed polymer, covered by a number of skin layers 52 made of a number of fibre layers. The blade shells 36, 38 may comprise further fibre-reinforcement at the leading edge and the trailing edge. Typically, the shell parts 36, 38 are bonded to each other via glue flanges.

Figures 4, 5:
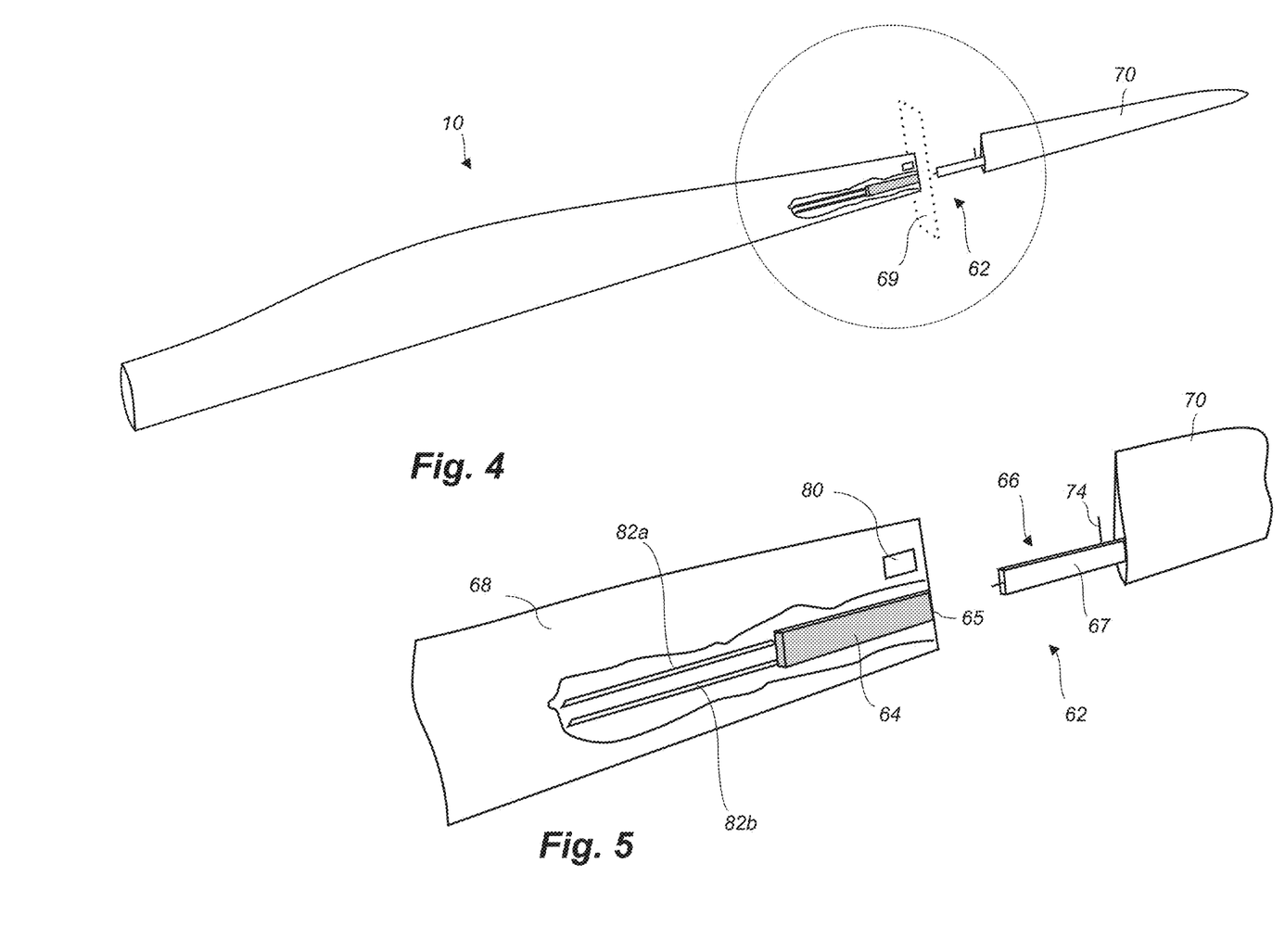
FIG. 4 is a schematic cut-open view of a wind turbine blade.
FIG. 5 is an enlarged view of the encircled section in FIG. 4, and FIGS. 6, 7 and 8 are perspective views of a spar structure.
Figure 8:
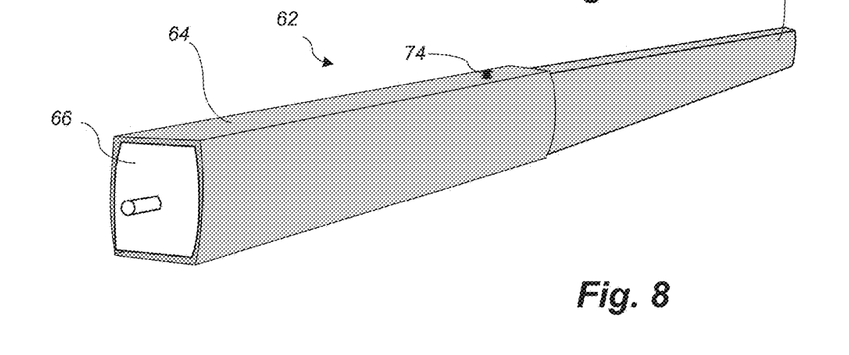

FIG. 4 is a schematic cut-open, exploded view of a wind turbine blade according to a co-pending application of the present applicant, wherein FIG. 5 is an enlarged view of the encircled section in FIG. 4. A pressure side shell half and a suction side shell half are typically manufactured over the entire length L of the wind turbine blade 10. A spar structure 62 is arranged within the shell. The spar structure 62 comprising a first part 64 and a second part 66, the first and second part being releasably coupled to each other, as shown in FIG. 8. The method advantageously comprises fixing the first part 64 of the spar structure 62 to one or both of the shell halves within the first blade segment 68 and fixing the second part 66 of the spar structure to one or both of the shell halves within the second blade segment 70.

The shell halves are then closed and joined, such as glued together for obtaining a closed shell, which is subsequently cut along a cutting plane 69 substantially normal to the spanwise direction or longitudinal extent of the blade to obtain a first blade segment 68 and a second blade segment 70. The cutting plane 69 coincides with an end surface 65 of the first part 64 of the spar structure.

As seen in FIGS. 4 and 5, the spar structure 62 extends across the cutting plane 69. As best seen in FIG. 5, the first part 64 of the spar structure 62, which takes the form of a box-shaped sheath member for at least partly enclosing the second part 66 of the spar structure in the illustrated embodiment, is fixed to the first blade segment 68. The second part 66 of the spar structure 62, which comprises a spar box in the illustrated embodiment, is fixed to the second blade segment 70, wherein the second part 66 extends beyond the second blade segment 70 into the first blade segment 68, when the blade segments are assembled.

Figure 6:
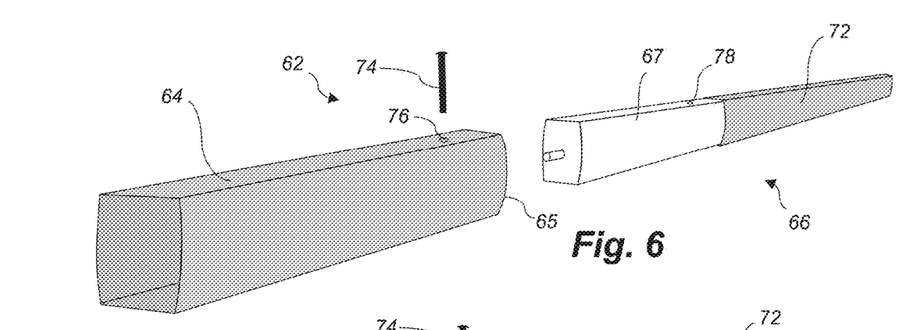
Figure 7:
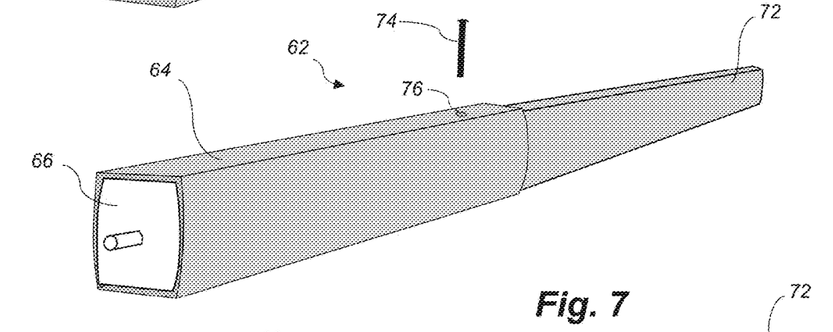

FIG. 5 also illustrates an access opening 80 within the upper half of the illustrated shell for accessing the spar structure and coupling and uncoupling the first and second part of the spar structure 62. For uncoupling, a locking pin, as illustrated in FIGS. 6-8, is withdrawn from the aligned respective apertures 76, 78 in each of the first and second part of the spar structure via the access opening 80. Prior to, or after, joining and sealing the first blade segment 68 to the second blade segment 70 for obtaining the wind turbine blade, the method advantageously comprises re-coupling the first and second part of the spar structure, via the access opening 80, as illustrated in FIG. 8, by re-inserting the locking pin 74 into the aligned respective apertures 76, 78 in each of the first and second part of the spar structure. As seen in FIGS. 4 and 5, the cutting step d1) does not comprise cutting the spar structure, only the shell halves are cut. In addition, two shear webs 82a, 82b are arranged within the first blade segment.

FIGS. 6, 7 and 8 illustrate an embodiment of the spar structure 62 with the first part 64 in the form of a conductive, box-shaped sheath member according to a co-pending application of the present applicant. Preferably, the conductive sheath member is part of a lightning protection system of the wind turbine blade. The second part 66 of the spar structure comprises a box spar 67, part of which is encased in a jacket 72, for example comprising a conductive mesh 72. The spar structure 62 comprises a locking pin 74 for releasably coupling the first part 64 to the second part 66 of the spar structure through aligned respective locking apertures 76, 78 in each of the first and second part of the spar structure.

Figure 9:
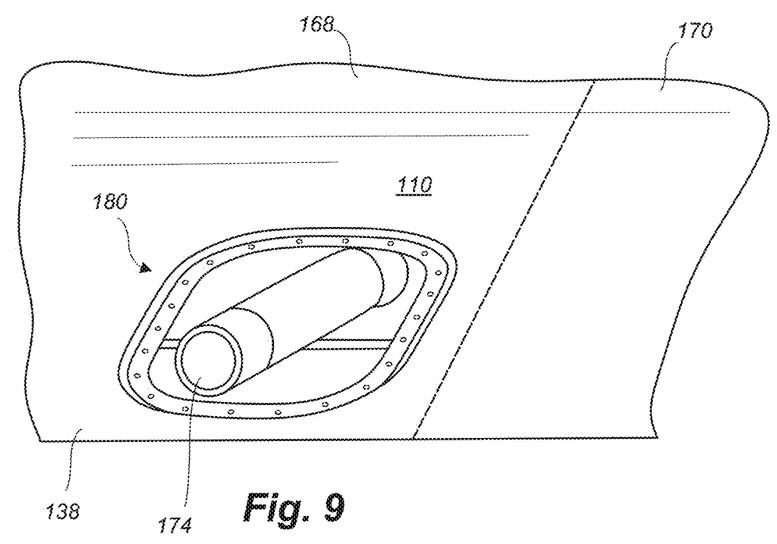
FIG. 9 is a partial perspective view of an access opening of a wind turbine blade.

FIG. 9 is a partial perspective view of an access opening 180 of a wind turbine blade. The wind turbine blade comprises a shell member 138, such as a suction side shell half, with an outer surface 110. The shell member 138 may comprise a first segment 168, such as a root end segment, connected to a second segment 170, such as a tip end segment. An access opening 180 is provided in the blade shell member 138 for allowing access to a hollow space within the blade, e.g. for inserting or withdrawing a locking pin 174 as described above.

Figure 10:
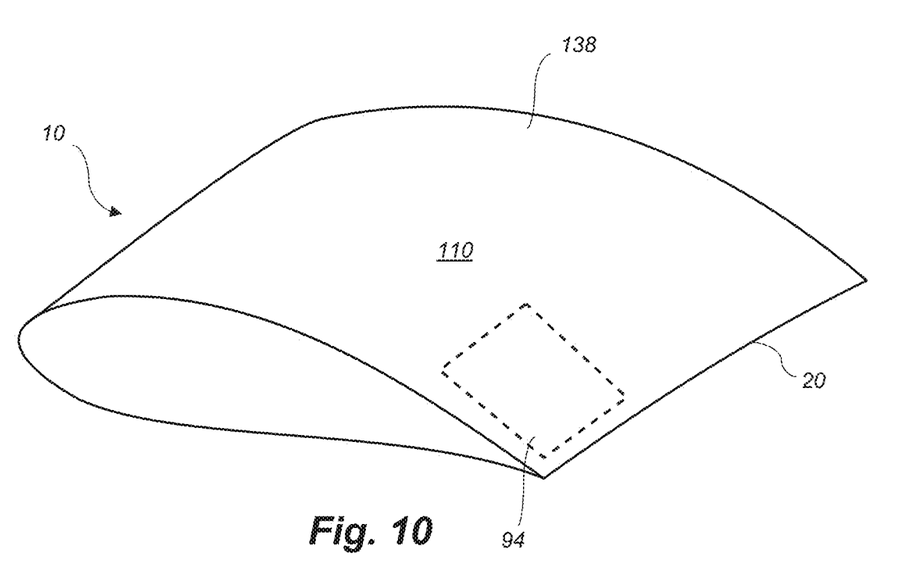
FIG. 10 is a perspective partial view of a wind turbine rotor blade.

FIG. 10 is a partial perspective view of a wind turbine rotor blade 10 with an outer surface 110, here illustrating the outer surface of a suction side shell half 138. In manufacturing the blade of the present invention, an access window 94 is cut through a shell body of the blade for allowing access to the interior thereof, as indicated by the hatched line in FIG. 10. In the illustrated example of FIG. 10, the access window is substantially rectangular and is provided close to the trailing edge of the blade.

Figure 11:
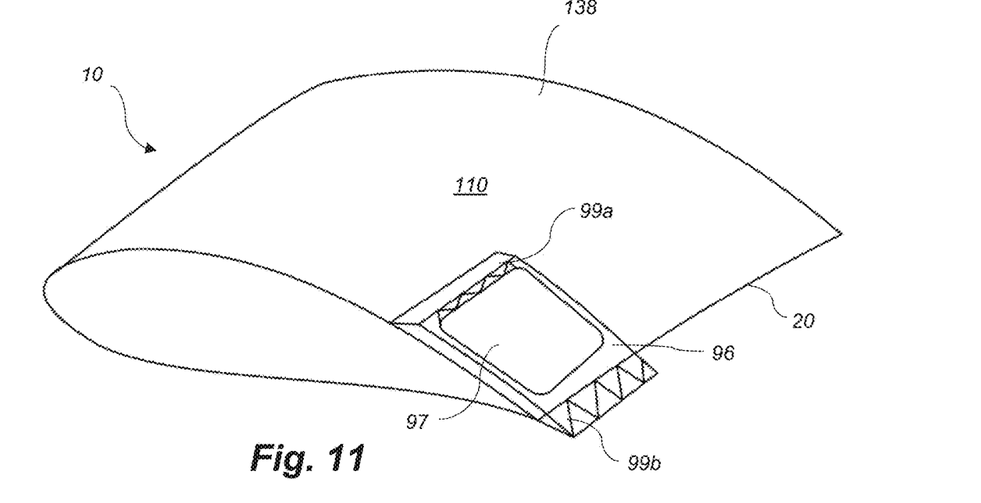
FIG. 11 is a perspective partial view of a wind turbine rotor blade according to the present invention.
Figure 12:
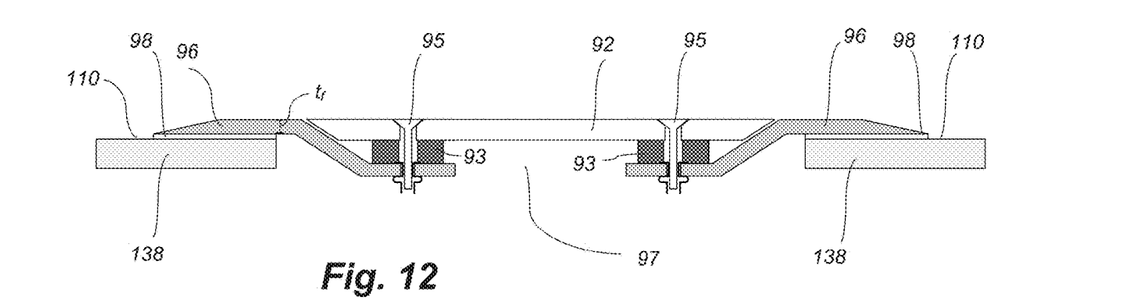
FIG. 12 is a cross sectional view through a wind turbine rotor blade according to the present invention at the location of the access window and the frame.

As illustrated in FIG. 11, a frame 96, which defines an opening 97, is arranged on top of the outer surface 110 of the blade 10 such that the opening 97 of the frame 96 is aligned with the access window 94. The frame 96 is preferably adhesively bonded to the blade surface. Part of the frame 96 extends beyond the trailing edge 20 of the blade as seen in a chord-wise direction. As illustrated in FIG. 12, a cover member 92 is arranged within the frame 96 to cover the opening 97 of the frame 96 and to close the access window. The cover member 92 is releasably fastened to the frame 96 by one or more fasteners 95 preferably made of one or more dielectric materials.

Figure 13:
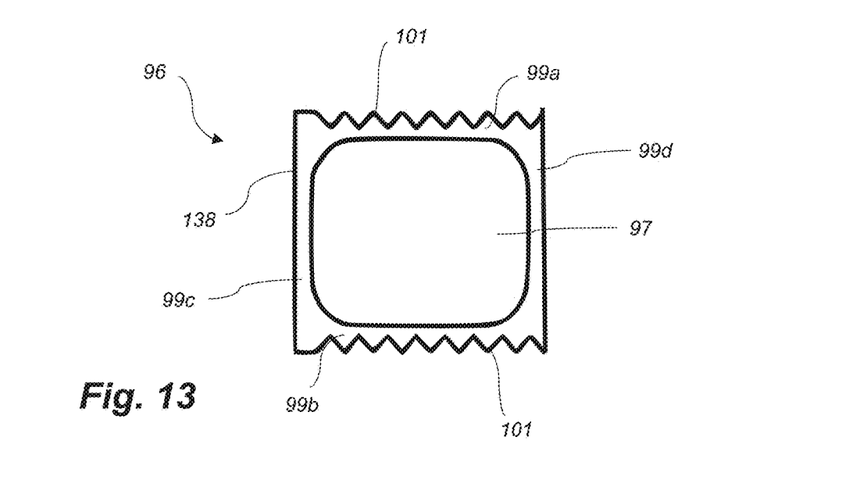
FIG. 13 is a top view of a frame according to the present invention.

As seen in FIGS. 11 and 12, the frame 96 and the cover member 92 protrude above the outer surface of the blade. Also, the frame 96 may comprises one or more aerodynamic surface features, such as one or more vortex generators, or noise reducing features such as one or more serrations 101, as illustrated in FIG. 13. The illustrated frame 96 is substantially rectangular and comprises a front member 99a, a rear member 99b and two lateral members 99c, 99d. The opening 97 is also substantially rectangular.

As illustrated in FIG. 11, the front member 99a is arranged substantially parallel to the leading edge of the blade, and the rear member 99b is arranged substantially parallel to the trailing edge 20 of the blade, wherein the front member 99a is arranged closer to the leading edge of the blade than the rear member 99b. The rear member 99b comprises one or more noise reduction devices such as serrations 101. FIGS. 11 and 12 also illustrate that the thickness $t_f$ of the frame tapers towards the outer circumference of the frame. This ensures a smooth transition between the outer blade surface and the frame.

The invention is not limited to the embodiments described herein and may be modified or adapted without departing from the scope of the present invention.

LIST OF REFERENCE NUMERALS 4 tower
6 nacelle
8 hub
10 blades
14 blade tip
16 blade root
18 leading edge
20 trailing edge
30 root region
32 transition region
34 airfoil region
36 pressure side shell part
38, 138 suction side shell part
40 shoulder
41 spar cap
42 fibre layers
43 sandwich core material
45 spar cap
46 fibre layers
47 sandwich core material
50 first shear web
51 core member
52 skin layers
55 second shear web
56 sandwich core material of second shear web
57 skin layers of second shear web
60 filler ropes
62 spar structure
64 first part
65 end surface of first part
66 second part
67 spar member
68, 168 first blade segment
69 cutting plane
70, 170 second blade segment
72 jacket/mesh
74, 174 locking pin
76 aperture
78 aperture
80, 180 access opening
82 shear web
90 access arrangement
92 cover
93 gasket
94 access window
95 fastener
96 frame
97 opening of frame
98 adhesive layer
99 members of frame
101 serrations
110 outer blade surface
L length
r distance from hub
R rotor radius

The invention claimed is:

1. A wind turbine blade (10) having a profiled contour including a pressure side and a suction side, and a leading edge and a trailing edge with a chord having a chord length extending therebetween, the wind turbine blade extending in a spanwise direction between a root end and a tip end, wherein the wind turbine blade comprises:
- an outer surface (110);
- an access window (94) extending through a shell body of the wind turbine blade;
- a frame (96) defining an opening (97), wherein the frame (96) is arranged on top of the outer surface of the wind turbine blade such that the opening of the frame (96) is aligned with the access window (94), wherein the frame (96) comprises one or more aerodynamic surface features; and
- a cover member (92) dimensioned for receipt within the frame (96) for covering the opening (97) of the frame (96) and for releasably closing the access window (94).

2. The wind turbine blade according to claim 1, wherein at least part of the frame (96) protrudes above the outer surface of the blade.

3. The wind turbine blade according to claim 1, wherein the cover member (92) is releasably fastened to the frame (96).

4. The wind turbine blade according to claim 1, wherein the frame (96) comprises a front member (99a), a rear member (99b) and two lateral members (99c, 99d), wherein the opening (97) is substantially rectangular, wherein the front member is arranged substantially parallel to the leading edge of the blade, and wherein the rear member is arranged substantially parallel to the trailing edge of the blade, wherein the front member is arranged closer to the leading edge of the blade than the rear member, and wherein the rear member comprises one or more noise reduction devices such as serrations, ridges, and/or finlets.

5. The wind turbine blade according to claim 4, wherein the front member is shaped in waveform or as a plurality of serrations.

6. The wind turbine blade according to claim 4, wherein the front member comprises one or more vortex generators.

7. The wind turbine blade according to claim 1, wherein the frame (96) is manufactured in an injection moulding process.

8. The wind turbine blade according to claim 1, wherein the cover member (92) is releasably fastened to the frame (96) by one or more fasteners made of one or more dielectric materials.

9. The wind turbine blade according to claim 1, wherein the one or more aerodynamic surface features comprise one or more vortex generators.

10. The wind turbine blade according to claim 1, wherein the one or more noise-reducing features comprise one or more serrations.

11. A method of manufacturing a wind turbine blade, wherein the wind turbine blade has a profiled contour including a pressure side and a suction side, the wind turbine blade further having a leading edge and a trailing edge with a chord having a chord length extending therebetween, the wind turbine blade extending in a spanwise direction between a root end and a tip end, the wind turbine blade comprising an outer surface (110) and an access window (94) extending through a shell body of the wind turbine blade, the wind turbine blade further comprising a frame (96) defining an opening (97), wherein the frame (96) is arranged on top of the outer surface of the wind turbine blade such that the opening of the frame (96) is aligned with the access window, the wind turbine blade further comprising a cover member (92) dimensioned for receipt within the frame (96) for covering the opening (97) of the frame (96) and for releasably closing the access window (94), the method comprising the steps of:
- manufacturing a pressure side shell half and a suction side shell half,
- arranging a spar structure within the pressure side shell half or within the suction side shell half, the spar structure (62) comprising a first part (64) and a second part (66), the first and second part (66) being releasably coupled to each other,
- cutting the access window through the suction side shell half or the pressure side shell half,
- arranging the frame on top of the outer surface of the wind turbine blade such that the opening of the frame is aligned with the access window extending through the shell half,
- bonding the frame to the shell half,
- arranging the cover member (92) within the frame for covering the opening of the frame and for closing the access window,
- joining the pressure side shell half and the suction side shell half for obtaining a closed shell body,
- cutting the closed shell body along a cutting plane (69) substantially normal to the spanwise direction of the closed shell body to obtain a first and a second blade segment (70), each blade segment comprising part of the pressure side shell half and part of the suction side shell half, wherein the spar structure (62) extends across the cutting plane (69),
- uncoupling the first and second part (66) of the spar structure (62),
- separating the first blade segment (68) from the second blade segment (70), and
- joining and sealing the first blade segment (68) to the second blade segment (70) for obtaining the wind turbine blade,
- wherein the spar structure (62) comprises at least one locking pin (74) for releasably coupling the first part (64) to the second part (66) of the spar structure (62) through aligned respective locking apertures in each of the first and second part (66) of the spar structure (62).

12. The method according to claim 11, wherein the step of uncoupling the first and second part (66) of the spar structure (62) comprises withdrawing the locking pin (74) from the aligned respective apertures in each of the first and second part (66) of the spar structure (62) via the access window.

13. The method according claim 11, wherein the method further comprises a step of re-inserting the locking pin (74) into the aligned respective apertures in each of the first and second part (66) of the spar structure (62) via the access window (90), after joining and sealing the first blade segment (68) to the second blade segment.

14. A wind turbine blade (10) having a profiled contour including a pressure side and a suction side, and a leading edge and a trailing edge with a chord having a chord length extending therebetween, the wind turbine blade extending in a spanwise direction between a root end and a tip end, wherein the wind turbine blade comprises:
- an outer surface (110);
- an access window (94) extending through a shell body of the wind turbine blade;
- a frame (96) defining an opening (97), wherein the frame (96) is arranged on top of the outer surface of the wind turbine blade such that the opening of the frame (96) is aligned with the access window (94), wherein the frame (96) comprises one or more noise-reducing features; and
- a cover member (92) dimensioned for receipt within the frame (96) for covering the opening (97) of the frame (96) and for releasably closing the access window (94).

15. A wind turbine blade (10) having a profiled contour including a pressure side and a suction side, and a leading edge and a trailing edge with a chord having a chord length extending therebetween, the wind turbine blade extending in a spanwise direction between a root end and a tip end, wherein the wind turbine blade comprises:
- an outer surface (110);
- an access window (94) extending through a shell body of the wind turbine blade;
- a frame (96) defining an opening (97), wherein the frame (96) is arranged on top of the outer surface of the wind turbine blade such that the opening of the frame (96) is aligned with the access window (94); and
- a cover member (92) dimensioned for receipt within the frame (96) for covering the opening (97) of the frame (96) and for releasably closing the access window (94),
- wherein at least part of the frame (96) extends beyond the trailing edge of the wind turbine blade (10) as seen in a chord-wise direction.

* * * * *